Nov. 15, 1960     F. A. FAZZALARI     2,960,325
MECHANISM FOR SUPPORTING AND SPACING SHEETS
Filed Jan. 13, 1958     5 Sheets-Sheet 1

INVENTOR.
FRANK A. FAZZALARI
BY
ATTORNEY

Nov. 15, 1960    F. A. FAZZALARI    2,960,325
MECHANISM FOR SUPPORTING AND SPACING SHEETS
Filed Jan. 13, 1958    5 Sheets-Sheet 2

INVENTOR.
FRANK A. FAZZALARI
BY
ATTORNEY

Nov. 15, 1960 F. A. FAZZALARI 2,960,325
MECHANISM FOR SUPPORTING AND SPACING SHEETS
Filed Jan. 13, 1958 5 Sheets-Sheet 3
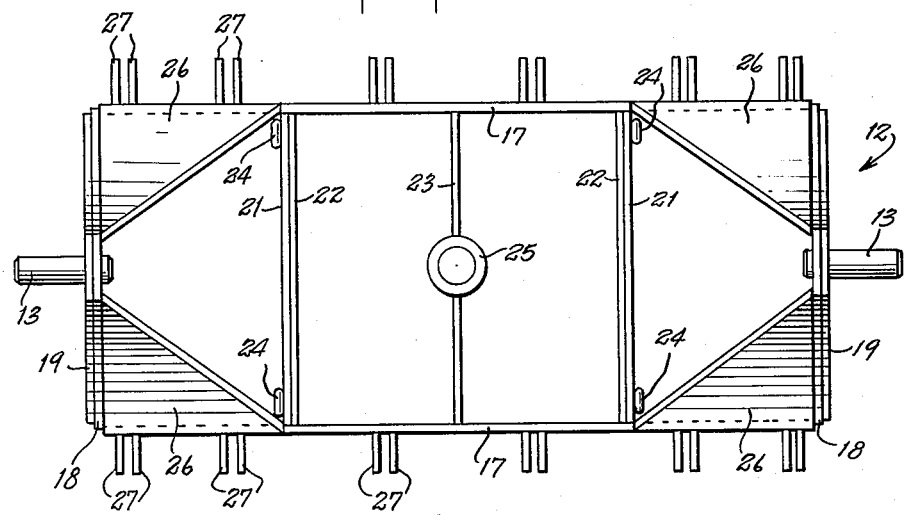
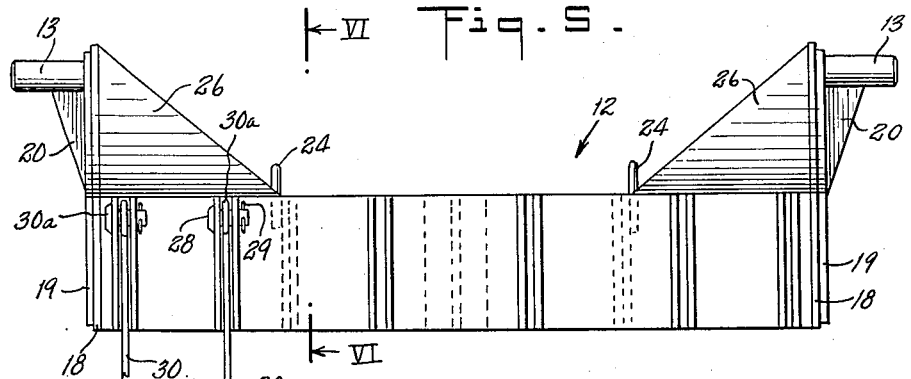
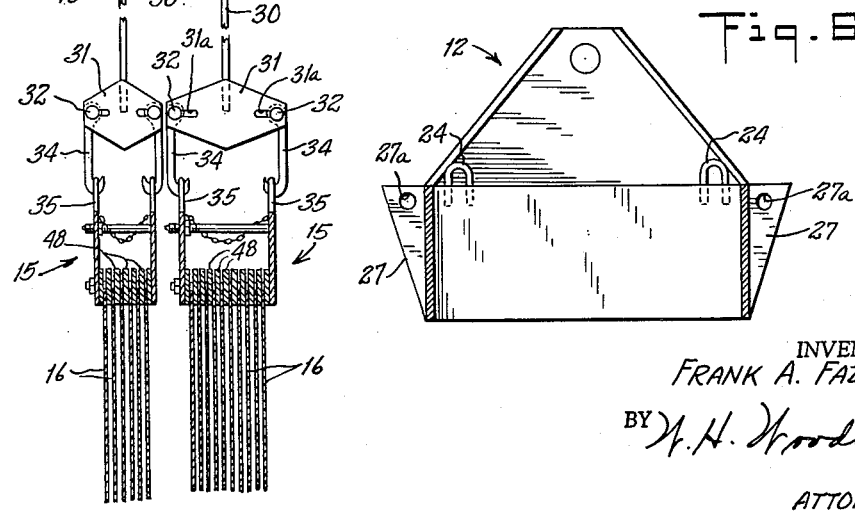
INVENTOR.
FRANK A. FAZZALARI
BY
ATTORNEY Nov. 15, 1960  F. A. FAZZALARI  2,960,325
MECHANISM FOR SUPPORTING AND SPACING SHEETS
Filed Jan. 13, 1958  5 Sheets-Sheet 4
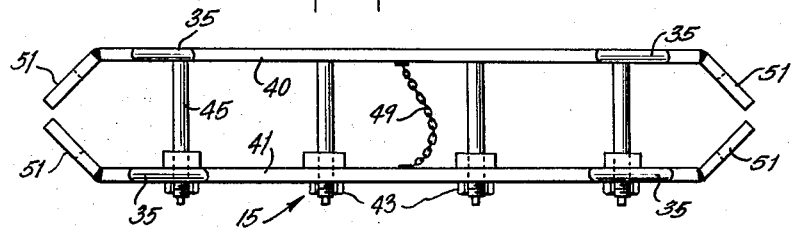
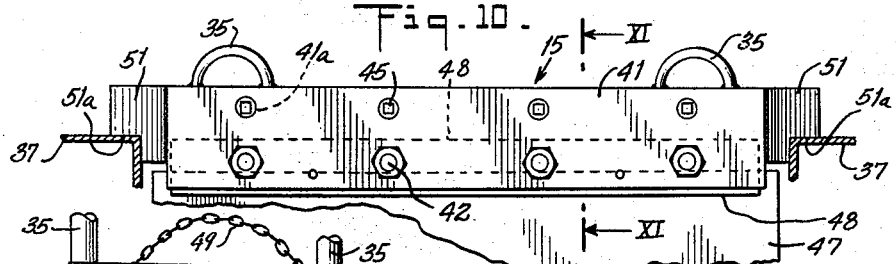
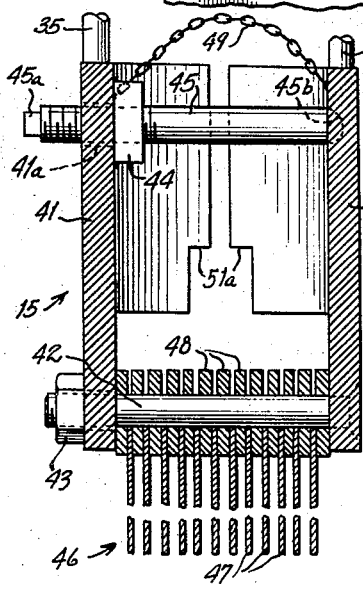
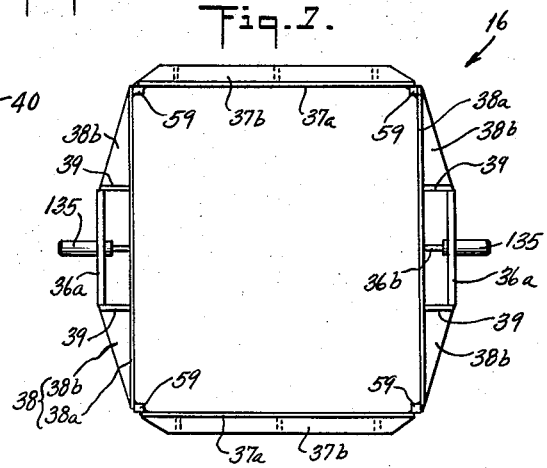
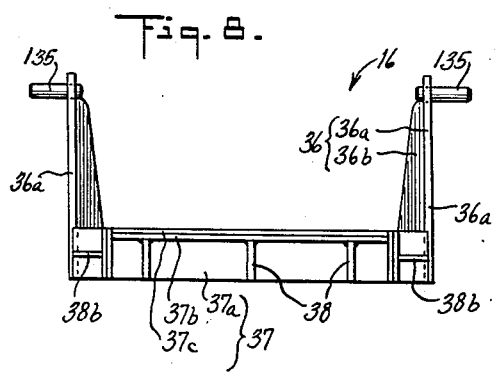
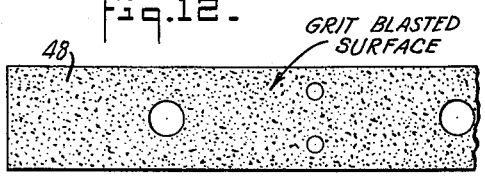
INVENTOR.
FRANK A. FAZZALARI
BY
ATTORNEY Nov. 15, 1960  F. A. FAZZALARI  2,960,325
MECHANISM FOR SUPPORTING AND SPACING SHEETS
Filed Jan. 13, 1958  5 Sheets-Sheet 5
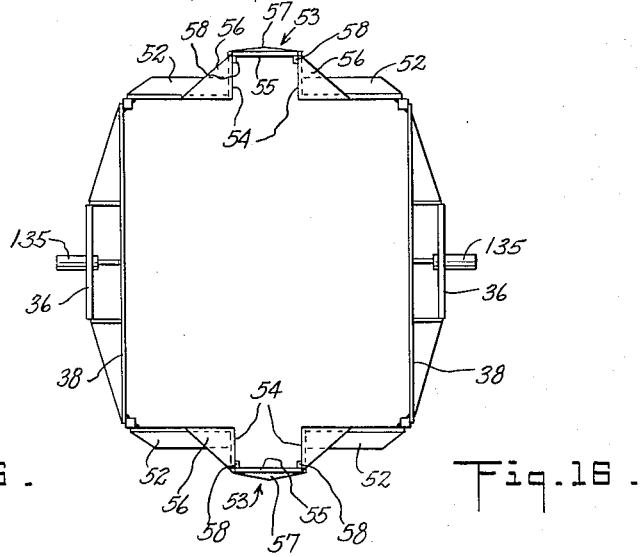
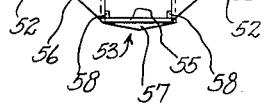
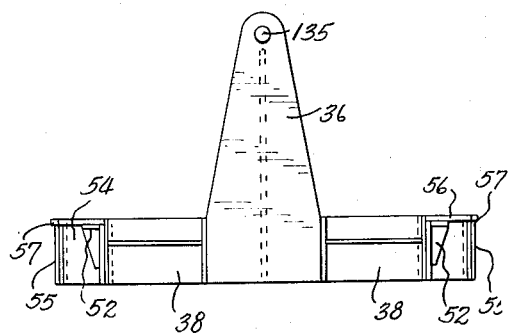
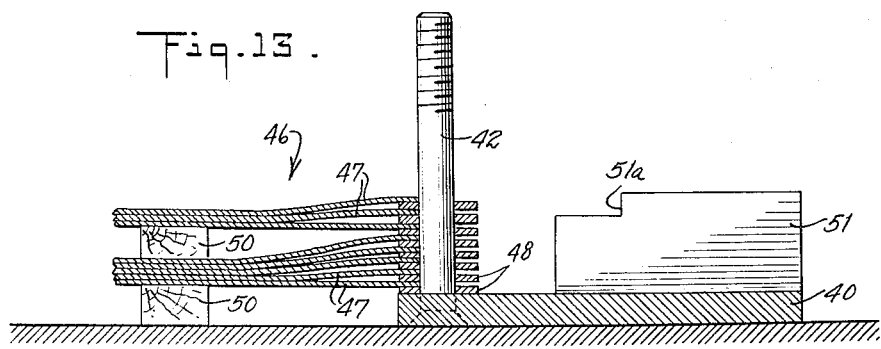
INVENTOR.
FRANK A. FAZZALARI
BY
ATTORNEY United States Patent Office 2,960,325
Patented Nov. 15, 1960

2,960,325

MECHANISM FOR SUPPORTING AND SPACING SHEETS

Frank A. Fazzalari, Canton, Ohio, assignor to Republic Steel Corporation, Cleveland, Ohio, a corporation of New Jersey Filed Jan. 13, 1958, Ser. No. 708,453

16 Claims. (Cl. 263—47)

This invention relates generally to improved apparatus for supporting and spacing sheets and particularly to apparatus for supporting and spacing metal sheets or plates in heat treatment furnaces, more particularly gas extraction furnaces.

The apparatus disclosed herein is intended for vertically suspending sheets of titanium and titanium alloys in a high temperature vacuum furnace during a process for the extraction of hydrogen from the sheets. The apparatus includes improved clamping means for gripping the upper marginal portions of the sheets and improved saddle means for supporting the clamping means within the furnace.

The apparatus described herein may be employed for the suspension of sheets of other materials and for use elsewhere than in gas extraction furnaces, although it is of particular utility in connection with such sheets and such furnaces.

Gases, particularly hydrogen, are absorbed by titanium and other metals during conventional manufacturing processes, e.g., acid pickling baths. These absorbed gases affect the quality of the material, particularly that characteristic known as "notch sensitivity," i.e., strength in the neighborhood of a cut or notch. A proportion of 150 parts per million of hydrogen is commonly found in metal sheets and other parts after their passage through conventional processes. Adverse effects due to hydrogen content may be completely removed by reducing the proportion of hydrogen to about 35 parts per million. To accomplish that extraction of hydrogen, in the case of titanium sheets and other parts, the material is heated to a temperature of 1250° to 1300° F. in a high vacuum (2 microns) in what is essentially a gas diffusion process. Substantially the entire surfaces of the sheets or other parts must be free from contact with other sheets or furnace parts, in order that the gas in all parts of the sheets may be removed. Consequently, it is necessary to hang the sheets by their upper marginal portions, and to space the vertically hung sheets from one another.

During the initial stages of the gas extraction process, the sheets are heated by circulating a heated, inert gas, e.g., helium, through the furnace. The effectiveness of the heating depends upon the access of the gas to substantially all areas of the sheets. Consequently, the spacing of the sheets is important during the initial heating process as well as during the subsequent gas extraction phase itself.

Furthermore, titanium and other metal sheets, if clean, have a tendency to weld or stick to each other upon contact at high temperatures. The spacing of the vertically hung sheets avoids the possibility of this sticking.

Clamp devices of the prior art which have been employed for vertically suspending sheets may be classified as either the friction type which holds the sheets by frictional grip against marginal portions thereof, or the hook type, by which hooks or other similar parts actually penetrate the sheets.

The hook type of clamp damages the marginal portions of the sheet so that it must be trimmed off after an operation in which a hook clamp is used. It is therefore desirable to use a friction type of clamp which will not damage the supported sheets.

The use of friction clamps in heat treatment furnaces presents a particular problem in that the expansion of the clamp parts may result in a decrease in the frictional grip between the clamping parts and the sheets, and a consequent dropping of the sheets within the furnace. For example, clamp structures intended for such use are commonly constructed of steel, usually stainless steel alloys. Since such steels have coefficients of linear thermal expansion which are substantially greater than the coefficient of the titanium sheets, a differential expansion takes place, which may result in a loss of gripping force. This problem has been minimized to some extent in previous clamping devices by employing clamps and spacers of low expansion steel.

An object of the present invention is to provide improved apparatus for suspending metal sheets.

Another object is to provide an improved clamping device for suspending metal sheets during a heat treatment process, including means to assure maintenance of a friction grip on the sheets at substantially all temperatures involved in the process.

Another object is to provide a clamping device of the type described which is economical to construct.

A further object is to provide an improved clamping and supporting apparatus of the type described which is compact and permits compact loading of the furnace, i.e., with a larger weight of material to be treated per unit cross-sectional area of the furnace than was possible with previous clamps.

Another object is to provide clamping apparatus of the type described, which may be loaded with sheets more rapidly than prior art clamps.

Another object is to provide an improved clamp of the type described which does not in any way damage the material being heat treated, and which does not adversely affect the heat treatment of the portion of the sheet engaged by a clamp.

Another object is to provide improved means for mounting clamps of the type described within a furnace or the like.

Another object is to provide improved apparatus for supporting such clamps, by which the clamps may be rapidly loaded into and unloaded from a furnace.

Another object is to provide an improved saddle structure for mounting clamps within a furnace or the like.

The foregoing and other objects of the invention are attained by providing a saddle having trunnions adapted to be supported on two diametrically opposite trunnion bearings fastened to the inside wall of the furnace near the top thereof and preferably in an unheated zone thereof. The saddle hangs down substantially below the trunnions and carries a plurality of improved clamps. The overall vertical dimension of the saddle and clamps are related to the dimensions of the heated and unheated zones of the furnace so that the top of the material to be heat treated is located well within the heated zone of the furnace.

Each clamp comprises two horizontally elongated, spaced parallel side plates connected together near their lower edges by a row of bolts. On the row of bolts is provided a stack of elongated spacer plates somewhat narrower than the two side plates. The upper margin of each sheet to be supported is clamped between two of the spacer plates, with its edge abutting the bolts on which the spacers are mounted.

A row of screws is threadedly inserted in one of the plates above the stack of spacers. The opposite ends of the screws abut against the other plate. By adjusting these screws, the spacing between the upper portions of the plates may be fixed.

The screws and the spacer plates are constructed of stainless steel. The bolts are constructed of Invar or other material having a low coefficient of linear thermal expansion. Each bolt therefore tends to expand less with temperature than the stack of spacers and supported sheets which are mounted on the bolts. Consequently, the heat in the furnace tends to tighten the stack of spacers and plates rather than to loosen it. Furthermore, since the screws are made of material having a higher coefficient of expansion than the stack of spacers and plates, the heat of the furnace tends to push the upper portions of the side plates farther apart than the lower portions, thereby further increasing the friction grip between the components of the stack of spacers and plates. The spacers are preferably grit blasted or otherwise have their surfaces roughened to provide a good frictional grip on the supported sheets.

Other objects and advantages of the invention will become apparent from a consideration of the following specification and claims, taken together with the accompanying drawings.

In the drawings:

Fig. 4 is a plan view of the clamp supporting saddle of Fig. 1;

Fig. 5 is a side elevational view of the saddle of Fig. 4, showing two clamps with their stacks of sheets supported on the saddle;

Fig. 6 is a vertical cross-sectional view taken on the line VI—VI of Fig. 5;

Fig. 7 is a plan view of the saddle structure shown in Fig. 3, with the clamps removed;

Fig. 8 is an elevational view of the saddle structure of Fig. 7;

Fig. 9 is a plan view of a single clamp constructed in accordance with the invention;

Fig. 10 is an elevational view of the clamp of Fig. 9, showing a sheet clamped thereby and showing the ends of the clamp supported on a saddle of the type of Fig. 7;

Fig. 11 is a vertical cross-sectional view taken on the line XI—XI of Fig. 10;

Fig. 12 is a fragmentary view of one of the spacer plates employed in the clamp;

Fig. 13 is a fragmentary cross-sectional view illustrating the method of loading the clamp of Figs. 9 to 11;

Fig. 14 is a plan view of another modified form of saddle structure;

Fig. 15 is a front elevational view of the saddle of Fig. 14; and

Fig. 16 is a side elevational view of the saddle of Fig. 14.

Figure 1:
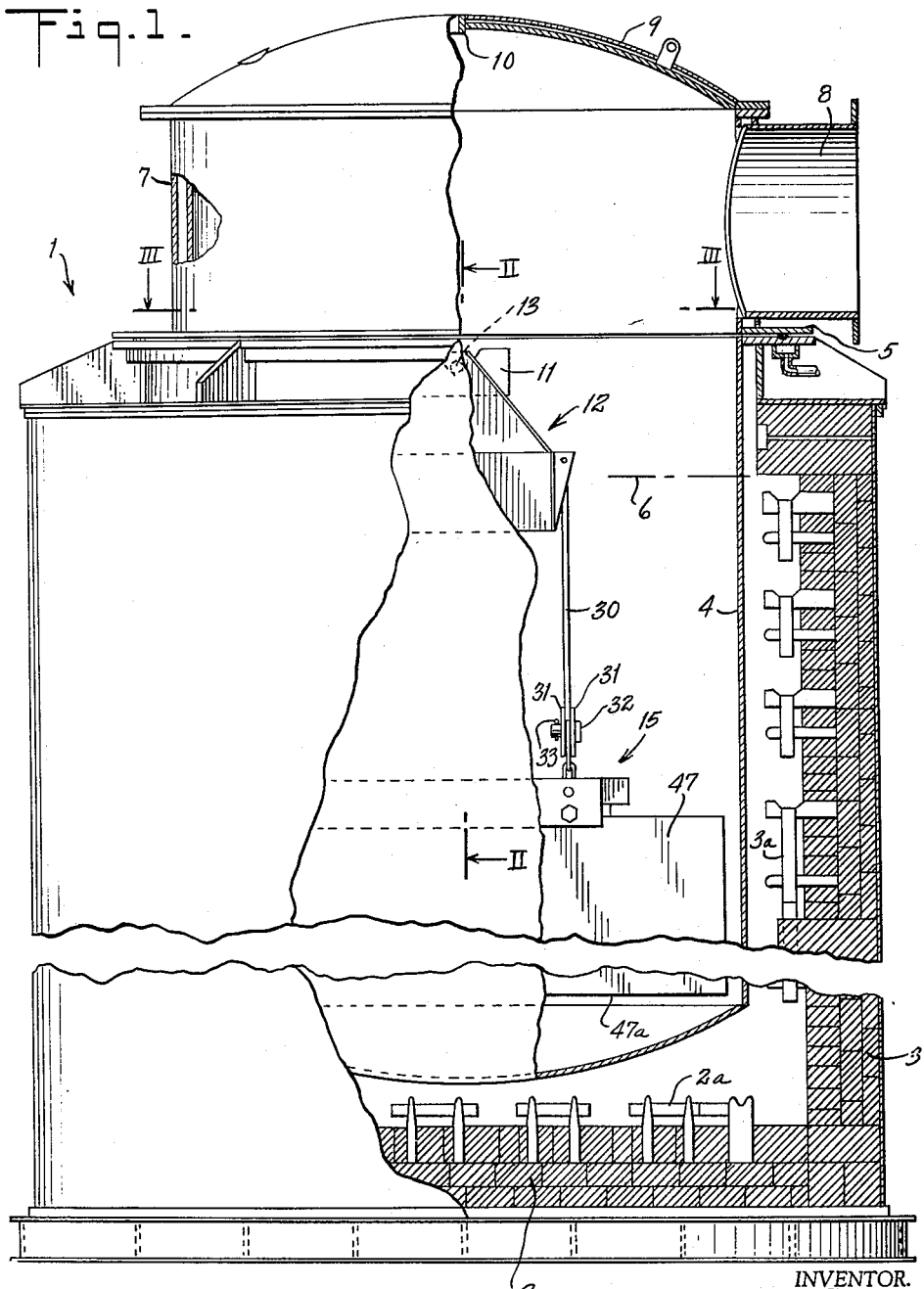
Fig. 1 is a view, partly in elevation, and partly in section, and with certain parts broken away, of a heat treatment furnace including a saddle and a sheet supporting clamp constructed in accordance with the invention.
Figure 2:
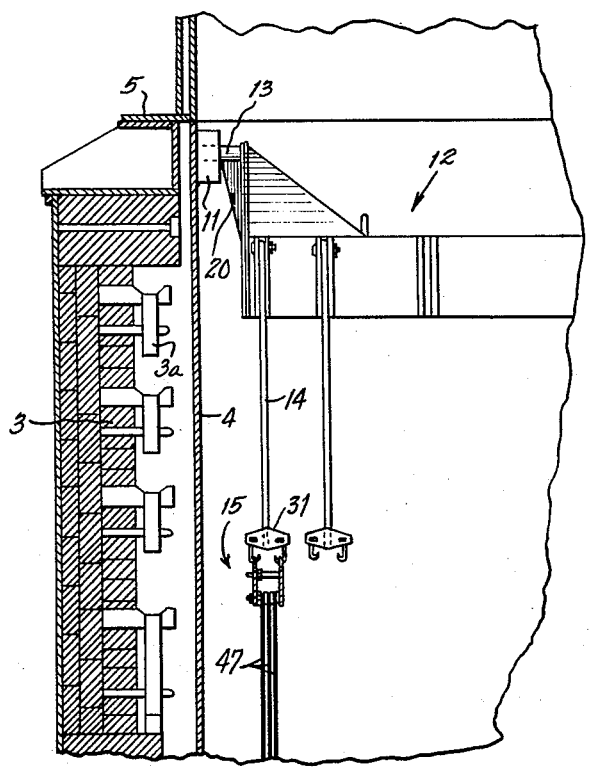
Fig. 2 is a fragmentary view partly in elevation and partly in vertical section taken on the line II—II of Fig. 1.

*Figs. 1 and 2*

There is shown in these figures a resistance type electrical furnace generally indicated by the reference numeral 1. This furnace includes a base 2 and a cylindrical side wall 3 on which are mounted resistance elements 2a, 3a for electrically heating the furnace. Inside the furnace there is located a cylindrical gas-tight muffle 4 closed at its lower end and supported on the furnace wall 3 by means of a flange 5 welded or otherwise attached to the upper end of the muffle.

The furnace may be divided into a heated zone located below the chain line 6 in Fig. 1 and an unheated zone, sometimes conventionally referred to as the "cold" zone, located above the line 6. Within the cold zone, the upper end of the muffle 4 is attached to a double cylindrical wall 7 having one or more ports 8 by means of which the pressure and content of atmosphere inside the muffle 4 may be controlled. The top of the wall 7 is closed by a double walled cover 9 having a central aperture in which a pipe 10 is inserted. The pipe 10 is provided for the insertion of pressure or temperature measuring instruments, e.g., the thermocouples, inside the muffle 4. The double wall 7 and the double walled cover 9 provide cooling jackets for circulation of water or other suitable coolant.

Welded or otherwise suitably fastened on the inner surface of the muffle 4, near its upper end, are two diametrically spaced trunnion bearings 11. A saddle 12, more completely described below in connection with Figs. 4 to 6, is mounted on the trunnion bearings 11 by means of a pair of trunnions 13. The saddle 12 supports, by hanger means 14, a plurality of clamps 15, two of which are shown in Fig. 2. Each clamp frictionally grips the upper marginal portions of a plurality of sheets 47. The sheets 47 depend from the clamp and may be of any length, as long as their lower ends clear the bottom of the muffle 4, as shown at 47a in Fig. 1.

Instead of the saddle 12, the saddle 16 shown in Fig. 3 and more completely described below in connection with Figs. 7 and 8 may be used. The overall vertical dimension of the saddle 12 or 16 and of the clamp 15 must be sufficient so that the top of the stack of plates 47 is located below the top of the heated zone (indicated by the chain line 6) by a distance approximately equal to the radius of the heated zone of the furnace 1. After the furnace is loaded, baffle plates (not shown) are placed above the saddle, to limit the upward loss of heat from the heated zone.

*Figs. 4 to 6*

The saddle 12 comprises two elongated side plates 17 welded at their ends to somewhat shorter end plates 18 to form a hollow rectangular frame. Reinforcing plates 19 are welded to the outer surfaces of the end plates 18. The reinforcing plates 19 are slightly smaller than the end plates 18. The trunnions 13 are fixed in the end plates 18 and reinforcing plates 19, as by means of welding. A pair of triangular webs 20 are welded at their edges to the reinforcing plates 19 and to the under sides of the trunnions 13. The upper edges of the plates 20 extend outwardly along the trunnions for a sufficient distance so that the ends of the webs 20 abut against the trunnion bearings 11, when the saddle is in place in the furnace. The plates 20 transmit a downward force to the trunnions. The trunnion bearings apply an upward force to the trunnions. By having the plates 20 extend up to the trunnion bearings 11, the trunnions 13 are stressed in shear at the locality adjacent the abutting surfaces of the plates 20 and the trunnion bearings 11. Bending moments applied to the trunnions 13 are thereby avoided. The shear strength of the trunnions 13 are substantially greater than their ability to resist bending moments. By making the plates 20 triangular, they also serve during loading of the furnace to guide the trunnions 13 and the saddle 12 into proper alignment with the trunnion bearings.

The rectangular frame consisting of the side plates 17 and the end plates 18 is provided with a plurality of transverse reinforcing plates 21, 22 and 23. The plates 21 and 22 have abutting surfaces welded to one another and their ends are welded to the side plates 17. The plates 21 have welded to their upper ends inverted U-shaped loops 24, best seen in Fig. 6, which are used for lifting the saddle 12 and the sheets mounted thereon by means of a crane during loading and unloading of the furnace.

The reinforcing plate 23 extends across the center of the frame and is provided at its middle with a vertically extending tube 25. When the saddle 12 is mounted within the furnace, the tube 25 is aligned with the vertical pipe 10 in the cover 9 and permits insertion of a thermocouple or other temperature measuring instruments downwardly into the center of the furnace. Triangular reinforcing plates 26 are welded along their lower sides to the upper sides of the end portions of the side plates 17, and along their diagonally vertically extending sides to the end plates 18. The plates 26 assist in transferring the load from the side plates 17 to the end plates 18 and thence to the trunnions 13.

The hanger means 14 comprises a plurality of hanger supports 27 arranged in pairs along the outer sides of the side plates 17. Each pair of hanger supports is spaced apart horizontally from the next adjacent pair. The hanger supports 27 are triangular plates having their wide dimension adjacent to their upper ends and are provided near such ends with apertures 27a for receiving headed pins 28 held in place by means of cotter keys 29. On each pin 28 there is mounted a hanger 30 having a loop or eye 30a at its upper end for receiving the pin 28. The lower end of each hanger 30 is welded to a pair of spaced clamp supporting plates 31. Each pair of plates 31 is provided with slots 31a adjacent to its opposite ends, through which are inserted headed pins 32 held in place by cotter keys 33 (see Fig. 1). Each pin 32 extends through an eye at the upper end of a downwardly depending hook 34. The hooks 34 engage loops 35 provided on clamps 15 which are described more completely in connection with Figs. 9 to 11.

The hanger supports 27 nearest the ends of the saddle 12 are more closely spaced from the next adjacent set of hanger supports than is the case with the other sets of hanger supports. When the saddle is mounted in the furnace, the hanger supports 27 nearest the ends of the saddle are closer to the side walls of the furnace and hence the stack of plates which they carry must be selected so as to clear the walls of the furnace. The selection for this purpose must be made both on the basis of the width of the plates and with due regard to the thickness of the stack.

The hangers 30 at the ends of the saddle 12 may be made shorter than the other hangers 30, since the portions of the furnace nearer the side walls run hotter than the central portion, being nearer the heating elements, and the spacing from the top of the heated zone need not therefore be as great.

Figure 3:
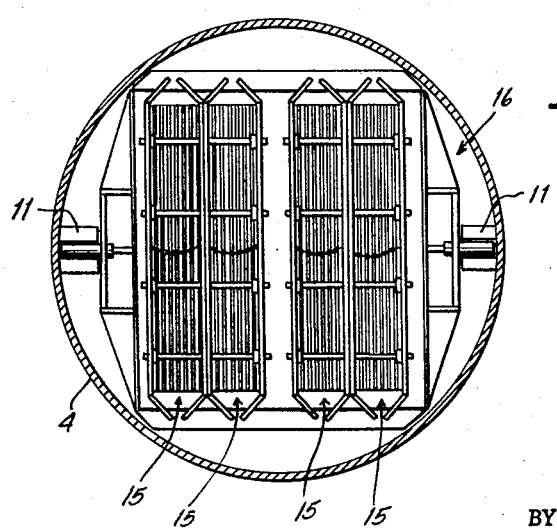
Fig. 3 is a plan view taken on a line corresponding to the line III—III of Fig. 1, but showing a different type of saddle mounted within the furnace.

*Figs. 3, 7 and 8*

These figures illustrate a modified form of saddle which may be used in place of that shown in Figs. 4 to 6. The saddle 16 includes a pair of trunnions 135 adapted to rest in the trunnion bearings 11. The trunnions 135 are mounted at the top of a pair of posts generally indicated by the reference numeral 36 and consisting of a vertically extending plate 36a and a vertical reinforcing rib 36b at right angles to the plate 36a. The saddle 16 also includes two side members 37 and two end members 38. The end members are substantially the same length as the side members, and all four members are welded together at their ends to form a hollow square, as best seen in Fig. 7. The side members 37 consist of vertically extending plates 37a and horizontally extending plates 37b and 37c projecting outwardly from the tops of the vertical plates 37a. Reinforcing members 38 connect the vertical plates 37a with the horizontal plates 37b. Reinforcing rods 59 are welded to the end members 38 and side members 37 at the internal corners of the hollow square.

The end members 38 consist of vertically extending plates 38a and horizontally extending plates 38b. Vertically extending plates 39 project outwardly from the plates 38a and are welded to the plates 36a of the column 36. Horizontal reinforcing plates 38b extend between the vertical plates 38a and the vertical plates 39. The horizontal dimension between the outside surfaces of the vertical post plates 36a is just slightly less than the horizontal dimension between the trunnion bearings 11, so that when the saddle 16 is mounted in the furnace, as shown in Fig. 3, the trunnion bearings 11 abut closely against the plates 36a which carry the trunnions 35. Consequently, the trunnions are stressed in shear, and substantially no bending moments are applied to them.

The clamp structures 15 are mounted on the saddle 16 by resting the ends of the clamps on the side members 37, as best seen in Fig. 3.

*Figs. 9 to 11*

These figures illustrate one individual clamp assembly 15 comprising a pair of side plates 40 and 41. A plurality of bolts 42 have their head ends welded or otherwise securely fastened to the side plate 40, and project therefrom freely through openings in the plate 41. The bolts 42 are threaded at their opposite ends to receive nuts 43. Near its upper edge, the plate 41 is provided with a plurality of apertures 41a. On the inner side of the plate 41 adjacent to the apertures 41a, there are mounted internally threaded lugs 44 for receiving threaded screws 45. The outer ends of the screws 45 project beyond the plate 41 and are provided with a square shank 45a or other suitable arrangement for rotating the screws. The inner ends of the screws 45 are rounded as best seen at 45b in Fig. 11, and rest in similarly rounded craters provided in the plate 40. By rotating the screws 45, the spacing between the upper ends of the plates 40 and 41 may be adjusted.

Mounted on the bolts 42 is a stack generally indicated by the reference numeral 46 and consisting of alternating sheets 47 and spacer plates 48. A single spacer plate is illustrated in Fig. 12, and is grit blasted on both surfaces to ensure good frictional engagement between the spacer plates 48 and the sheets 47.

A chain 49 is welded at its ends to the plates 40 and 41 and is adapted to receive the hook of a crane (not shown) for transporting the loaded clamp.

The loading of the clamp 15 is best illustrated in Fig. 13. To load the clamp the plate 40 is laid on a table or other flat surface and the spacer plates 48 and sheets 47 are mounted on the row of bolts 42, being alternated in the stack 46. The edges of the sheets must abut against the bolts 42. These edges of the sheets must be squared, the sheets being trimmed to secure square edges if necessary. Each sheet is thus clamped between two spacer strips or plates along its upper margin. In order to make sure that the gas content of this upper marginal portion of the sheets can be released during the gas diffusion process, the upper marginal portion which is clamped between the spacer plates must not be wider than 1″. The gas in the sheets then has to travel not over one-half inch to reach a free surface either at the edge of the spacer plate or at the edge of the sheet between the bolts 42.

In loading the clamp, care must be taken that the edges of the sheets 47 abut squarely against the bolts 42. For that purpose, wooden spacer strips 50 are laid on the table with the side plate 40 to ensure that the first sheet 47 is at the correct height to abut squarely against the bolts 42. As the stack is built up by alternately placing spacer plates 48 and sheets 47 on the stack, care must be taken to keep the level of the sheets substantially equal with the level of the stack. For that purpose, additional spacer strips 50 may be added to the pile of sheets from time to time. After the stack is built up, the other side plate 41 is placed on the top of the stack and the nuts 43 are applied to bolts 42 and tightened down to bind the stack. This operation tends to pinch the ends of the sheets 47 between the spacers 48 and will cause the ends of the plates 40 and 41 opposite the bolts 42 to move toward each other. The screws 45 are then turned into the threaded lugs 44 and the ends 45b of said screws brought to bear against the sockets or seats in plate 40. By turning the screws 45, the corresponding ends of the plates 40 and 41 are spread apart the said plates brought into substantial parallelism. As a practical matter, the screws 45 are not turned enough to bring the plates quite into parallel relationship; rather allowance is made for a slight expansion when the assembly is heated which brings the plates into parallelism and tightly binds the clamped sheets as explained below.

After the stack is tightened the strips 50 may be removed and the clamp and stack raised to vertical position as illustrated in Figs. 10 and 11.

The bolts 42 are made of Invar (a well-know alloy of approximately 35% nickel, balance iron) or other suitable alloy having a very low coefficient of thermal expansion. The spacers 48 are made of stainless steel or like suitable heat resistant alloy having a substantial coefficient of expansion. The titanium or titanium alloy sheets 47 also have a significant coefficient of thermal expansion which is in excess of that for Invar. Consequently, when the stack is heated, it expands more than the bolts 42, which tend to restrain the stack between plates 40 and 41. Since the bolts 42 expand less than the stack, they hold the plates 47 in tight compression. The frictional grip between the spacers 48 and the sheets 47 correspondingly increases.

The screws 45 are made of stainless steel having a coefficient of linear expansion greater than the coefficient of the Invar bolts. Consequently, at the elevated furnace temperature to which the assembly is exposed, the upper portions of the plates 40 and 41 are forced apart a greater distance than the lower portions of said plates are permitted to move by virtue of the restrictive influence of the relatively little expanding bolts 42. Such movement of the upper ends of the plates tends to pivot the plates outwardly about the bolts 42 as a fulcrum, thereby further increasing the compressive force on the spacers 48 and sheets 47. This pinching action assures a tight grip on the upper edges of the sheets 47.

As mentioned above, the side plates 40 and 41 are provided with upwardly extending loops 35 for receiving the hooks 34 by which the clamp may be suspended from the saddle 12.

For mounting the clamp 15 on the saddle 16 of Figs. 7 and 8, the ends of the side plates 40 and 41 are bent over and inwardly as illustrated at 51 in Fig. 9, at an angle of about 45° with the main portions of the side plates. The lower sides of the bent over portions 51 are notched as shown at 51a in Fig. 10 to receive side members 37 of the saddle 16. The notches 51a determine the horizontal positions of the clamps 15 and prevent contact between the ends of the sheets 47 and the side members 37 of the saddle 16.

The side plates 40 and 41 are bent over as illustrated at 51 in order to provide greater clearance between the ends of the clamps and the side walls of the furnace, while maintaining the same amount of supporting material for bearing the weight of the clamp and stack of plates. (See Fig. 3.)

Note that the plate 40 is completely smooth on its outer side. When assembling clamps and stacks of sheets on a saddle 16, two clamp assemblies are placed with their smooth sides back to back on each side of the center of the saddle 16, as best seen in Fig. 3. This arrangement leaves space through the center of the furnace for the insertion of the heat measuring thermocouple.

When using the saddle 12 illustrated in Figs. 4 to 6, the saddle is supported on a suitable rack or frame outside the furnace and is there loaded with clamps which have themselves been previously loaded with sheets. The entire loaded saddle is then lifted by a crane using loops 24, and is lowered into the open top of a furnace, the cover of which has been removed.

On the other hand, when using the saddle 16, it is first mounted in the furnace and the loaded clamps are thereafter placed individually in the saddle 16. The hollow square structure of saddle 16 does not readily lend itself to being lifted by a crane after it has been loaded.

Figs. 14 to 16

These figures illustrate a modified form of saddle structure which may be used in place of the saddle 16.

The end members 38, the posts 36, and the trunnions 135 of this saddle structure are the same as in the saddle 16, and such parts have been given the same reference numerals. However, the side members 37 are replaced by side members 52. The end portions of those side members 52 are structurally sismilar to the end portions of the side members 37. However, their central portions are constructed as outriggers generally indicated by the reference numeral 53. These outriggers allow the use of a longer clamp at the central portion of the saddle so as to allow the mounting of sheets of maximum width within the furnace.

The outriggers 53 comprise a pair of vertical outwardly extending plates 54 connected at their ends by a vertical plate 55. Horizontal reinforcing plates 56 of a generally triangular contour connect the plates 54 with the end portions of the side members 52. Triangular reinforcing plates 57 are mounted on the outer sides of the upper edges of the plate 55.

Reinforcing rods 58, of square cross-section, are welded in the internal corners of the outriggers 53.

While I have shown and described certain preferred embodiments of my invention, other modifications thereof will readily occur to those skilled in the art, and I therefore intend my invention to be limited only by the appended claims.

What is claimed is:

1. Apparatus for supporting sheet-like articles during heat treatment, comprising a substantially vertical cylindrical furnace having walls defining a heated zone and an unheated zone above the heated zone, a pair of trunnion bearings mounted on said walls at opposite localities in said unheated zone and projecting inwardly from said walls; a saddle comprising a substantially oblong, horizontally extending frame and having a pair of posts extending upwardly from opposite localities on said frame, trunnions on the upper ends of said posts and projecting outwardly therefrom and adapted to be received in said trunnion bearings, a plurality of hanger supports projecting outwardly from each of the longer side of said frame; at least one horizontally elongated clamp adapted to grip the upper marginal portion of at least one of said sheet-like articles, hangers depending from said hanger supports and arranged detachably to support each said clamp at points adjacent to the ends thereof, each clamp being supported by a hanger depending from opposite sides of said frame so that each clamp extends substantially parallel to the shorter sides of said frame; said posts, said hangers and each said clamp having an overall vertical dimension at least equal to the vertical spacing between the trunnion bearings and the heated zone, so that an article supported by the clamp is entirely within the heated zone when the trunnions are resting in the trunnion bearings.

2. Apparatus as defined in claim 1, in which said posts extend upwardly from the centers of the short sides of the frame, said trunnions extending outwardly from the tops of the posts, and including a pair of guides attached to and extending upwardly along the outer sides of the posts and attached to and extending outwardly along the trunnions, said guides being effective during loading of the saddle into the furnace so as laterally to guide the saddle, and being effective to transfer stress to the trunnions at localities closely adjacent to the trunnion bearings, so that the trunnions are stressed substantially only in shear.

3. Apparatus for supporting articles during heat treatment, comprising a furnace having walls defining a heated zone and an unheated zone above the heated zone, a pair of trunnion bearings mounted on said walls at opposite localities in said unheated zone and projecting inwardly from said walls, a saddle comprising a horizontally extending frame and a pair of posts extending upwardly from opposite localities on said frame, trunnions on the upper ends of said posts and projecting outwardly therefrom and adapted to be received in said trunnion bearings, at least one clamp adapted to grip the upper margin of at least one article, means on said saddle for supporting said clamp; said posts, said clamp supporting means, and said clamp having an overall vertical dimension at least equal to the vertical spacing between the trunnion bearings and the heated zone, so that an article supported by the clamp is entirely within the heated zone when the trunnions are resting in the trunnion bearings; in which said posts extend upwardly from the centers of the short sides of the frame, said trunnions extending outwardly from the tops of the posts, and including a pair of guides attached to and extending upwardly along the outer sides of the posts and attached to and extending outwardly along the trunnions, said guides being effective during loading of the saddle into the furnace so as laterally to guide the saddle, and being effective to transfer stress to the trunnions at localities closely adjacent to the trunnion bearings, so that the trunnions are stressed substantially only in shear.

4. Apparatus for supporting sheet-like articles during heat treatment, comprising a substantially vertical cylindrical furnace having walls defining a heated zone and an unheated zone above the heated zone, a pair of trunnion bearings mounted on said walls at opposite localities in said unheated zone and projecting inwardly from said walls; a saddle comprising a substantially square, hollow, horizontally extending frame and a pair of posts extending upwardly from opposite localities on said frame, trunnions on the upper ends of said posts and projecting outwardly therefrom and adapted to be received in said trunnion bearings; a plurality of clamps, each adapted to grip the upper marginal portion of at least one sheet-like article; said saddle having portions of two opposite side frame members arranged to support said clamps, each said clamp resting at its ends on said side frame members; said posts, said frame and said clamps having an overall vertical dimension at least equal to the vertical spacing between the trunnion bearings and the heated zone, so that an article supported by the clamp is entirely within the heated zone when the trunnions are resting in the trunnion bearings; and in which said two opposite side frame members comprise end portions extending at right angles to the other two side frame members and middle portions spaced outwardly from said end portions and connected thereto by beams, said middle portions being adapted to support a longer clamp than is supported by the end sections, said longer clamp being adapted to support an article of greater horizontal dimension.

5. Apparatus for supporting articles during heat treatment, comprising a furnace having walls defining a heated zone and an unheated zone above the heated zone, a pair of trunnion bearings mounted on said walls at opposite localities in said unheated zone and projecting inwardly from said walls, a saddle comprising a horizontally extending frame and a pair of posts extending upwardly from opposite localities on said frame, trunnions on the upper ends of said posts and projecting outwardly therefrom and adapted to be received in said trunnion bearings, at least one clamp adapted to grip the upper margin of at least one article, means on said saddle for supporting said clamp, said posts, said clamp supporting means and said clamp having an overall vertical dimension at least equal to the vertical spacing between the trunnion bearings and the heated zone, so that an article supported by the clamp is entirely within the heated zone when the trunnions are resting in the trunnion bearings; wherein said frame comprises four side members connected at their ends to form a rectangle, cross-bracing means extending across said rectangle, and a plurality of spaced hanger supports projecting outwardly from two opposite sides of the rectangle, said clamp supporting means comprises a plurality of hangers depending from the hanger supports, and said clamp includes means at each end thereof for engaging hangers on opposite sides of the frame; and wherein said frame further comprises a tube attached to said cross-bracing means at the center of said rectangle, and providing an aperture for insertion of a thermocouple into the center of the furnace.

6. Apparatus for supporting articles during heat treatment, comprising a furnace having walls defining a heated zone and an unheated zone above the heated zone, a pair of trunnion bearings mounted on said walls at opposite localities in said unheated zone and projecting inwardly from said walls, a saddle comprising a horizontally extending frame and a pair of posts extending upwardly from opposite localities on said frame, trunnions on the upper ends of said posts and projecting outwardly therefrom and adapted to be received in said trunnion bearings, at least one clamp adapted to grip the upper margin of at least one article, means on said saddle for supporting said clamp, said posts, said clamp supporting means and said clamp having an overall vertical dimension at least equal to the vertical spacing between the trunnion bearings and the heated zone, so that an article supported by the clamp is entirely within the heated zone when the trunnions are resting in the trunnion bearings; wherein said frame comprises four reinforced side members connected at their ends to form a hollow square, two opposite ones of said side members having upper surfaces adapted to support a clamp, and said clamp has extensions at its ends adapted to rest on said two side members.

7. A saddle for supporting a plurality of articles on a pair of spaced trunnion bearings, comprising a horizontally extending frame comprised of four side members cooperating to define a substantially hollow square, posts extending upwardly at opposite sides of said frame and spaced apart by a distance slightly less than the space between said trunnion bearings, a pair of trunnions extending outwardly from the upper ends of said posts and adapted to rest in said bearings, two U-shaped extensions projecting outwardly from the middle portions of the two sides of said hollow square other than those sides at which said posts are located each of said U-shaped extensions being arranged substantially in the plane of said hollow square and being comprised of members attached at the ends of the U to end portions of said members of which said hollow square is made up, said saddle being arranged to support a plurality of articles through the intermediation of elongated clamp means, each of said clamp means being supported on said saddle in a position generally parallel to the sides of said hollow square with which said posts are associated, whereby said U-shaped projections are arranged to support clamp means which are longer than those supported by the remainder of said saddle and whereby to make the maximum use of a substantially cylindrical space in which said saddle may support articles.

8. A clamp for gripping and thereby suspending sheets in parallel spaced relation, comprising two elongated parallel plates, a plurality of bolts fastened to and projecting from one of said plates and having ends projecting through apertures in the other plate, said bolts being spaced longitudinally along said plates, a plurality of elongated combined spacers and gripping means mounted on said bolts, each spacer having a plurality of apertures freely receiving the bolts, each adjacent pair of said spacers cooperating with said bolts for receiving and gripping an imperforate marginal portion of a sheet to be gripped between and supported by said adjacent pair of spacers, with the upper edge of said marginal portion abutting said bolts, a plurality of nuts threadedly engaging the projecting ends of the bolts and tightenable thereon to clamp said plates, said spacers and said sheets together in a pack so that said spacers tightly grip said sheets, the clamping action of said bolts and the nuts thereon in conjunction with said spacers gripping imperforate marginal portions only of said sheets tending to cause said plates to be moved to non-parallel positions, and adjustable spacing means extending between said plates and located adjacent to the marginal portions of the plates opposite said sheets, said adjustable spacing means being operable to maintain the plates substantially parallel.

9. A clamp as defined in claim 8, in which the effective coefficient of thermal expansion of said pack is greater than the coefficient of thermal expansion of said bolts, whereby upon heating of the pack and clamp in a furnace, the greater expansion of the pack tends to tighten the clamp.

10. A clamp as defined in claim 8, in which said adjustable means comprises a plurality of screws threadedly attached to one of said plates and extending therethrough toward the other plate, each said screw having a blunt end received in a recess in said other plate.

11. A clamp as defined in claim 8, in which said adjustable means comprises a plurality of screws threadedly attached to one of said plates and extending therethrough and into engagement with the other of said plates; and in which the coefficient of thermal expansion of said screws is greater than the effective coefficient of thermal expansion of the pack and of the bolts, whereby upon heating of the pack and clamp in a furnace, the greater expansion of said screws tends to force said opposite sides of the plates apart, so that the plates tilt about said bolts as a fulcrum and the portions of the plates adjacent to the pack are moved toward each other, thereby increasing the clamping force on the pack.

12. A clamp as defined in claim 8, in which said spacers have roughened surfaces to ensure a firm frictional grip on the sheets.

13. Apparatus for suspending a plurality of sheets in parallel spaced relation by frictionally gripping marginal portions of each sheet, comprising an oblong saddle frame extending horizontally, a plurality of lugs spaced apart and projecting outwardly from the long sides of the frame, hanger links depending from said lugs, a horizontally extending beam on the lower end of said hanger link and projecting therefrom in both directions parallel to said long sides, a pair of hooks depending from the ends of each beam, and a plurality of sheet clamps, each supported on two pairs of hooks located at opposite sides of the beam, each clamp comprising two elongated parallel plates with their long dimension horizontal and their flat sides extending substantially vertically, two spaced loops extending upwardly from the upper edge of each of said plates and adapted to be engaged by two of said hooks located at opposite sides of the beam, a plurality of bolts fastened to and projecting from one of said plates and having ends projecting through apertures in the other plate, said bolts being spaced longitudinally along said plates, a plurality of elongated spacers mounted on said bolts, each spacer having a plurality of apertures freely receiving the bolts, each adjacent pair of said spacers cooperating with said bolts to define an aperture for receiving a marginal portion of a sheet to be supported, with the edge of said marginal portion abutting said bolts, a plurality of nuts threadedly engaging the projecting ends of the bolts and tightenable thereon to clamp said plates, said spacers and said sheets together in a pack, and adjustable means extending between said plates and located adjacent to the marginal portions of the plates opposite said sheets, said adjustable means being operable to maintain the plates substantially parallel.

14. Apparatus for suspending a plurality of sheets in parallel spaced relation by frictionally gripping marginal portions of each sheet, comprising a saddle frame comprising four side members cooperating to define a hollow square, and a plurality of sheet clamps, each clamp comprising two elongated parallel plates with their long dimensions horizontal and their flat sides extending substantially vertically, said plates spanning said frame and having their ends resting on the sides of said square, a plurality of bolts fastened to and projecting from one of said plates and having ends projecting through apertures in the other plate, said bolts being spaced longitudinally along said plates, a plurality of elongated spacers mounted on said bolts, each spacer having a plurality of apertures freely receiving the bolts, each adjacent pair of said spacers cooperating with said bolts to define an aperture for receiving a marginal portion of a sheet to be supported, with the edge of said marginal portion abutting said bolts, a plurality of nuts threadedly engaging the projecting ends of the bolts and tightenable thereon to clamp said plates, said spacers and said sheets together in a pack, and adjustable means extending between said plates and located adjacent to the marginal portions of the plates opposite said sheets, said adjustable means being operable to maintain the plates substantially parallel.

15. Apparatus for suspending a plurality of sheets during heat treatment, comprising a furnace having cylindrical walls defining a heated zone, means defining an unheated zone above the heated zone, a saddle, means in said unheated zone to support said saddle, said saddle including support engaging means and a frame substantially below said support engaging means and located in said heated zone when said support engaging means is resting on said support means, said frame comprising four side members cooperating to define a hollow square receivable in said cylindrical furnace with close clearances at the corners of the square, and a plurality of sheet clamps, each clamp comprising two elongated parallel plates with their long dimensions horizontal and their flat sides extending substantially vertically, said plates spanning said frame and having their ends resting on the sides of said square, said plates having their ends bent over toward each other so that the plates nearest the corners clear the sides of the furnace, a plurality of bolts fastened to and projecting from one of said plates and having ends projecting through apertures in the other plate, said bolts being spaced longitudinally along said plates, a plurality of elongated spacers mounted on said bolts, each spacer having a plurality of apertures freely receiving the bolts, each adjacent pair of said spacers cooperating with said bolts to define an aperture for receiving a marginal portion of a sheet to be supported, with the edge of said marginal portion abutting said bolts, a plurality of nuts threadedly engaging the projecting ends of the bolts and tightenable thereon to clamp said plates, said spacers and said sheets together in a pack, and adjustable means extending between said plates and located adjacent to the marginal portions of the plates opposite said sheets, said adjustable means being operable to maintain the plates substantially parallel.

16. Apparatus for suspending a plurality of sheets during heat treatment, comprising a furnace having cylindrical walls defining a heated zone, means defining an unheated zone above the heated zone, a saddle, means in said unheated zone to support said saddle, said saddle including support engaging means and a frame substantially below said support engaging means and located in said heated zone when said support engaging means is resting on said support means, said frame comprising four side members cooperating to define a hollow square receivable in said cylindrical furnace with close clearances at the corners of the square, and a plurality of sheet clamps, each clamp comprising two elongated parallel plates with their long dimensions horizontal and their flat sides extending substantially vertically, said plates spanning said frame and having their ends resting on the sides of said square, a plurality of bolts fastened to and projecting from one of said plates and having ends projecting through apertures in the other plate, said bolts being spaced longitudinally along said plates, a plurality of elongated spacers mounted on said bolts, each spacer having a plurality of apertures freely receiving the bolts, each adjacent pair of said spacers cooperating with said bolts to define an aperture for receiving a marginal portion of a sheet to be supported, with the edge of said marginal portion abutting said bolts, a plurality of nuts threadedly engaging the projecting ends of the bolts and tightenable thereon to clamp said plates, said spacers and said sheets together in a pack, a plurality of screws threadedly attached to said other plate and extending therethrough toward said one of said plates, each said screw having a blunt end received in a recess in said one of said plates, said screws and said bolts both extending beyond said other plate, so that when two clamps are assembled side by side on said frame with their said other plates adjacent to one another, the projecting ends of the screws and bolts on the respective clamps are directed toward each other and provide space for insertion of a thermocouple through the space between the clamps and into the furnace.

References Cited in the file of this patent
UNITED STATES PATENTS

| | | |
|---|---|---|
| 1,581,526 | Willsea | Apr. 20, 1926 |
| 1,923,106 | Mason | Aug. 22, 1933 |
| 2,383,307 | Hansen | Aug. 21, 1945 |
| 2,698,610 | Langvand et al. | Jan. 4, 1955 |
| 2,805,054 | Hill | Sept. 3, 1957 |